(12) United States Patent
Murray et al.

(10) Patent No.: US 6,811,323 B2
(45) Date of Patent: Nov. 2, 2004

(54) ASSEMBLY AND METHOD FOR USE IN TERMINATING AN OPTICAL FIBER OR FIBERS

(75) Inventors: David Patrick Murray, Bristol (GB); Ian George, Glos (GB); Neil David Elliott, Glos (GB)

(73) Assignee: Krone GmbH, Berlin-Zehlendorf (DE)

( * ) Notice: Subject to any disclaimer, the term of this patent is extended or adjusted under 35 U.S.C. 154(b) by 0 days.

(21) Appl. No.: 10/311,026

(22) PCT Filed: Jun. 11, 2001

(86) PCT No.: PCT/GB01/02548
§ 371 (c)(1),
(2), (4) Date: Dec. 11, 2002

(87) PCT Pub. No.: WO01/96923
PCT Pub. Date: Dec. 20, 2001

(65) Prior Publication Data
US 2003/0133671 A1 Jul. 17, 2003

(30) Foreign Application Priority Data

Jun. 12, 2000 (GB) .............................................. 0014308
Jan. 29, 2001 (GB) .............................................. 0102284

(51) Int. Cl.[7] .............................................. G02B 6/36
(52) U.S. Cl. ........................................ 385/80; 385/86
(58) Field of Search .............................. 385/80, 86, 55

(56) References Cited
U.S. PATENT DOCUMENTS 4,588,256 A  5/1986  Onstott et al.
4,787,699 A  11/1988  Moulin
5,446,819 A  8/1995  Foster et al.
2002/0067894 A1 * 6/2002  Scanzillo ...................... 385/80

FOREIGN PATENT DOCUMENTS

EP  0 689 070 A1  12/1995
JP  61284710 A  * 12/1986  ............ G02B/6/24
JP  4-40402  5/1992

* cited by examiner

Primary Examiner—Hae Moon Hyeon
(74) Attorney, Agent, or Firm—Rader, Fishman & Grauer PLLC

(57) ABSTRACT

An optical fiber terminating assembly has an outer body (10), a first member (11) locatable in the outer body (10) and which carries a protruding length of optical fiber (36) which locates an alignment structure (44, 45) and a housing (12) locatable in alignment with the first member (11). The housing (12) has an access opening for receiving an optical fiber (52, 53) to be terminated so that the fiber can be located in the alignment structure in abutment with the optical fiber length (35). The housing has a compartment (47) which receives a heat responsive adhesive element (57), a saddle (58) and a resistor (59). When a current is passed through the resistor, the heat generated is transmitted by the saddle to the adhesive which melts and flows around the optical fiber (52, 53) to secure it in position in abutment with the optical fiber length (35).

23 Claims, 7 Drawing Sheets

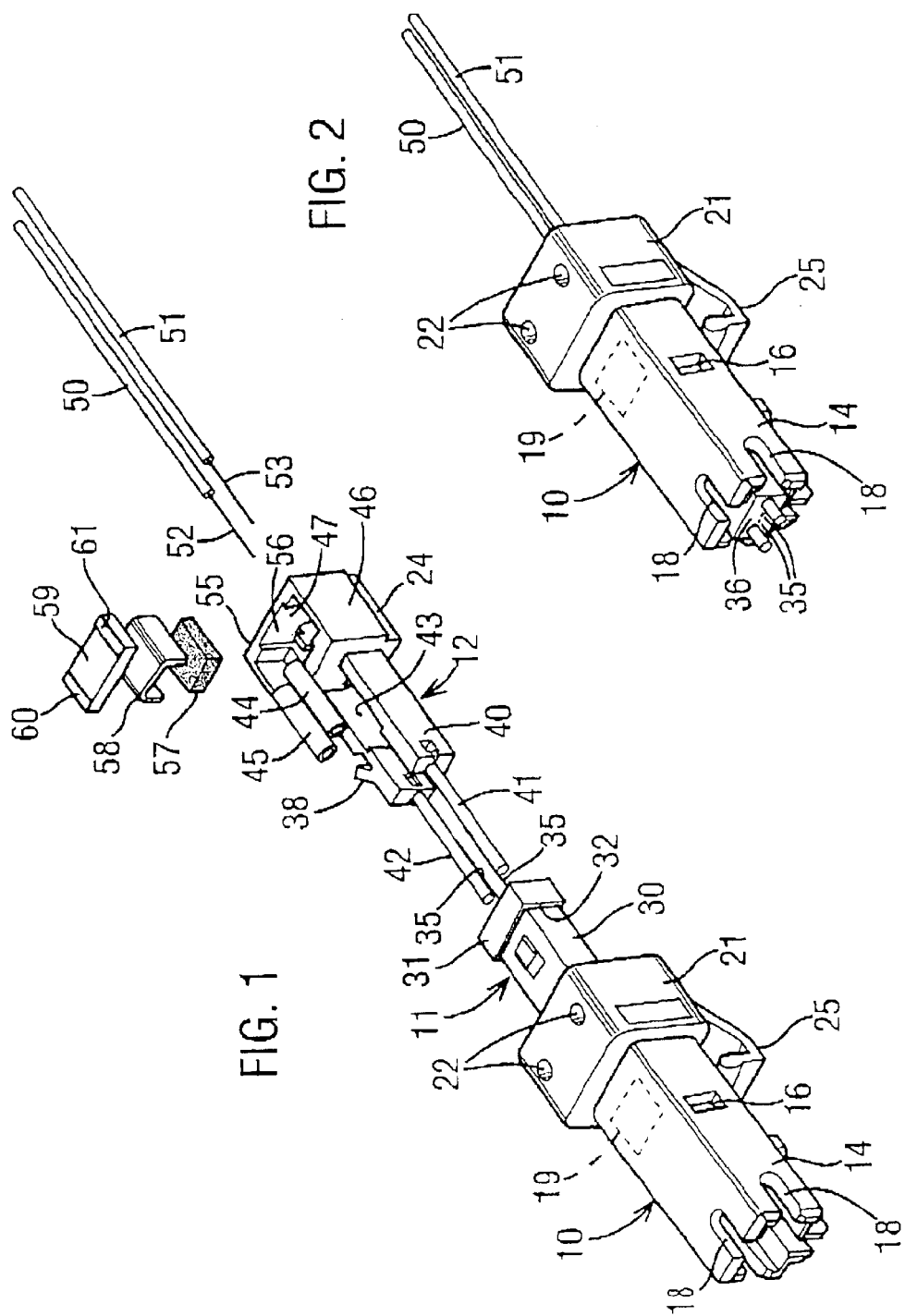

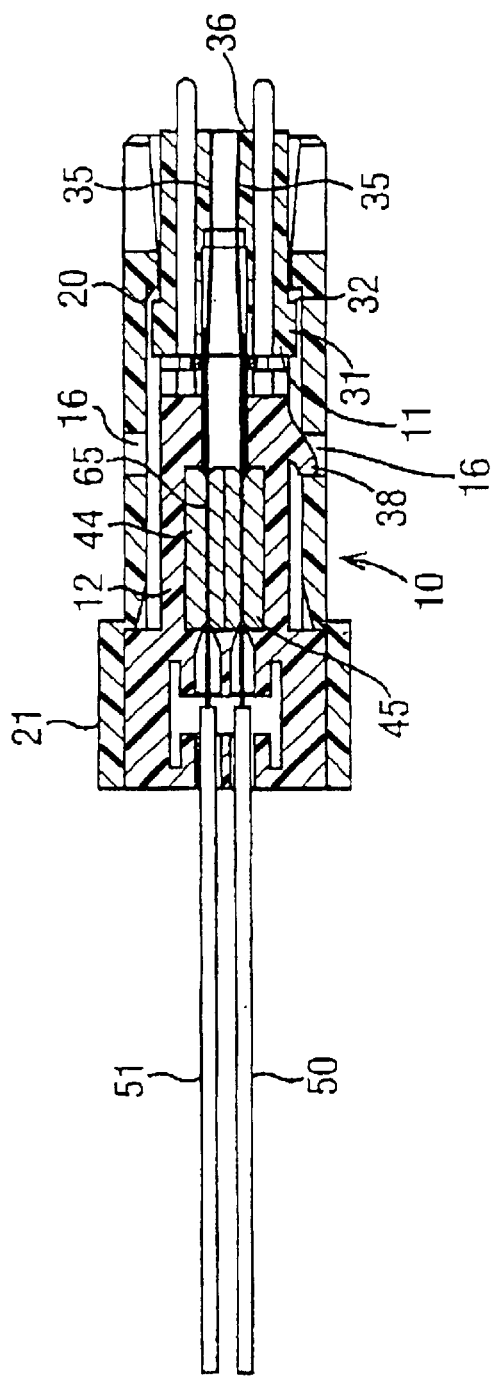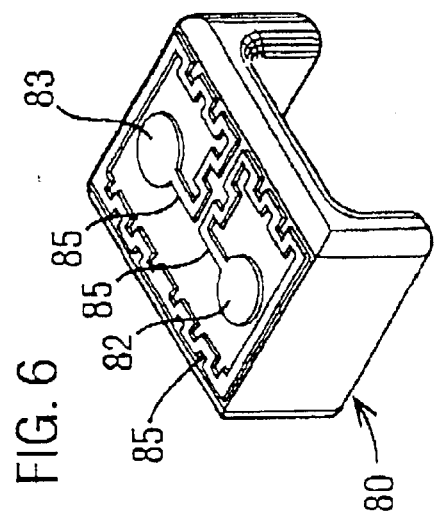

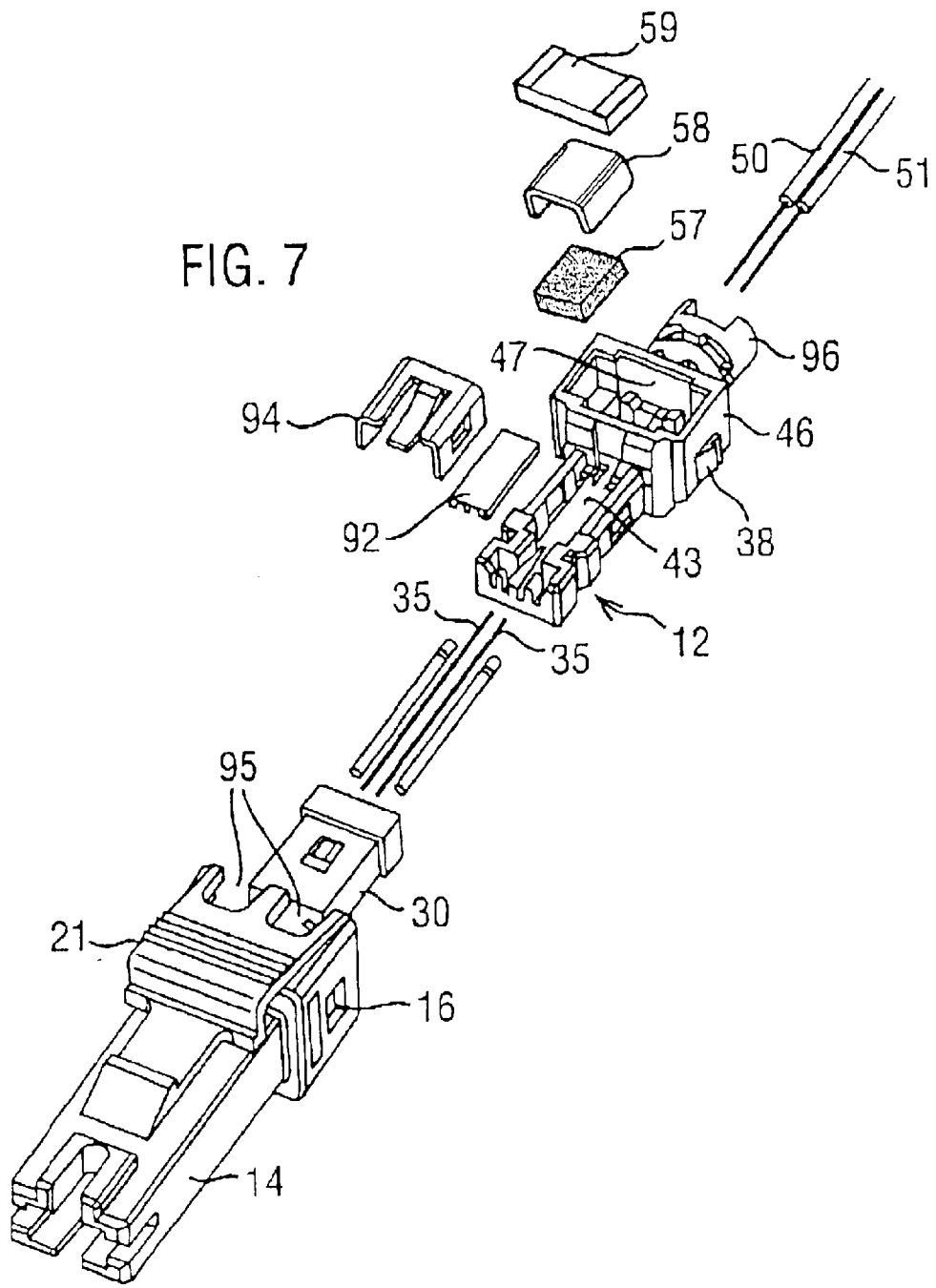

ASSEMBLY AND METHOD FOR USE IN TERMINATING AN OPTICAL FIBER OR FIBERS

FIELD OF THE INVENTION

This invention relates to an assembly for use in terminating an optical fiber or optical fibers.

BACKGROUND OF THE INVENTION

The use of optical fibers as a signal-carrying medium for communications is now extremely widespread and continues to increase. Optical fibers are used not only in cables which interconnect geographically separated locations, but also within buildings themselves. As such there is a need for an optical fiber termination which can be used in the field in order to terminate an optical fiber or fibers.

SUMMARY OF THE INVENTION

According to a first aspect of the present invention there is provided an assembly for use in terminating an optical fiber comprising a housing which can receive the optical fiber to be terminated so that it is located in alignment with a length of another optical fiber, or an optoelectronic device, the housing including a compartment through which the optical fiber to be terminated can extend, the compartment being designed to receive a heat responsive adhesive element and a thermally conductive element, which can be coupled to a source of energy so that heat in the thermally conductive element causes the adhesive to melt and flow around the optical fiber to secure it in position.

According to a second aspect of the present invention there is provided an assembly for use in terminating an optical fiber comprising an outer body member, a first member locatable within the body member, the first member carrying a length of optical fiber which protrudes therefrom, a housing locatable in alignment with the first member, an optical fiber alignment means for receiving the end of the length of optical fiber which protrudes from the first member, the housing having an access opening for receiving an optical fiber to be terminated so that such fiber can be located in the alignment means so as to be aligned and abutted with the optical fiber length, the housing including a compartment through which the optical fiber to be terminated extends, the compartment being designed to receive a heat responsive adhesive element and a thermally conductive element, which can be coupled to a source of energy so that heat in the thermally conductive element causes the adhesive to melt and flow around the optical fiber to secure it in position. By heat responsive adhesive is meant a material which in the presence of heat can assume a condition in which it can flow or be caused to flow and subsequently harden again on cooling in order to secure an optical fiber in position.

The compartment may accommodate the heat responsive adhesive, the thermally conductive element, and an electrically conductive element.

The compartment may accommodate the heat responsive adhesive and the thermally conductive element, with access to the compartment being provided for a heat source. The electrically conductive element may be a resistor.

The thermally conductive element may be a metallic element. The thermally conductive element may be a saddle which straddles the adhesive element.

The outer body member may include one or more openings so located as to allow connection of an electrical power source to the electrically conductive element or thermal contact to an external heat source.

The plug assembly may be used to terminate more than one optical fiber. The assembly may include a plurality of optical fiber alignment elements. The alignment element or elements may comprise a sleeve or sleeves, a V groove or grooves, ceramic or metal ferrules, glass capillary triple rod aligners or a combination of these.

A third aspect of the present invention provides a method of terminating an optical fiber or fibers using an assembly such as described, which comprises positioning the end of an optical fiber to be terminated in the housing so it is in alignment with the length of the other optical fiber, or optoelectronic device, heating the thermally conductive element such that the adhesive assumes the state in which it can flow around the optical fiber to be terminated and secured in position in alignment with the optical fiber length.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is an exploded view of an assembly in the form of a plug assembly in accordance with an embodiment of the present invention;

FIG. 2 is a perspective view of the plug assembly;

FIG. 5 is a sectional view taken on the line 5—5 of FIG. 3;

FIG. 6 is a perspective view showing a modification of a component in the plug assembly of FIG. 1;

FIG. 7 is an exploded view of a modification of the embodiment of FIG. 1;

DESCRIPTION OF THE PREFERRED EMBODIMENTS

Figure 3:
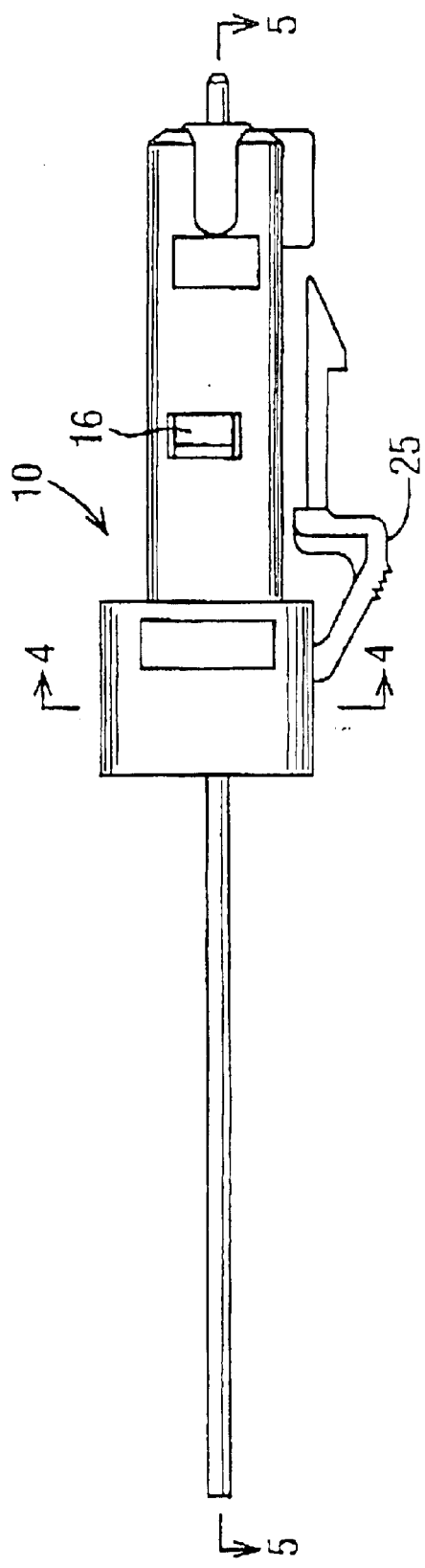
FIG. 3 is a side elevation of the plug assembly.

Referring to the drawings in particular, FIGS. 1 to 5 shows a plug assembly for use in terminating an optical fiber or optical fibers comprises an outer body member 10, a first member part 11 and a housing part 12. These parts can all be molded from suitable plastics materials.

The outer body member has a body portion 14 which defines therein a space of generally rectangular cross-section which can receive the first member 11. Two opposite side walls of the body portion 14 each have an aperture 16 formed therein at a generally central location. The open end of the body portion 14 has four longitudinally extending slots identified by reference number 18, the slots 18 being arranged so that one slot 18 is formed in each of the walls of the body portion 14.

The internal surface of the body portion 14 is formed with a step 20 which is illustrated in FIG. 5 of the drawings. The top wall of the body portion 14 can have a transparent section 19.

Figure 4:
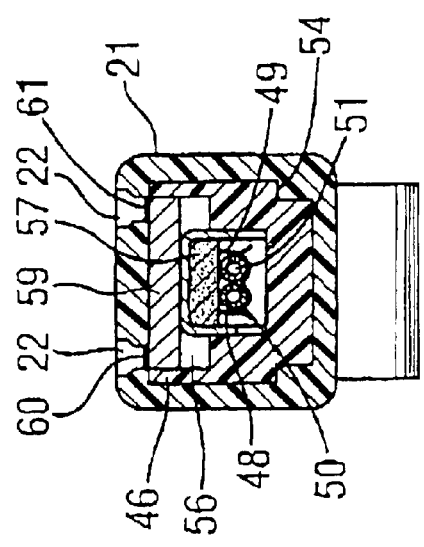
FIG. 4 is a section taken on the line 4—4 of FIG. 3.
Figure 8:
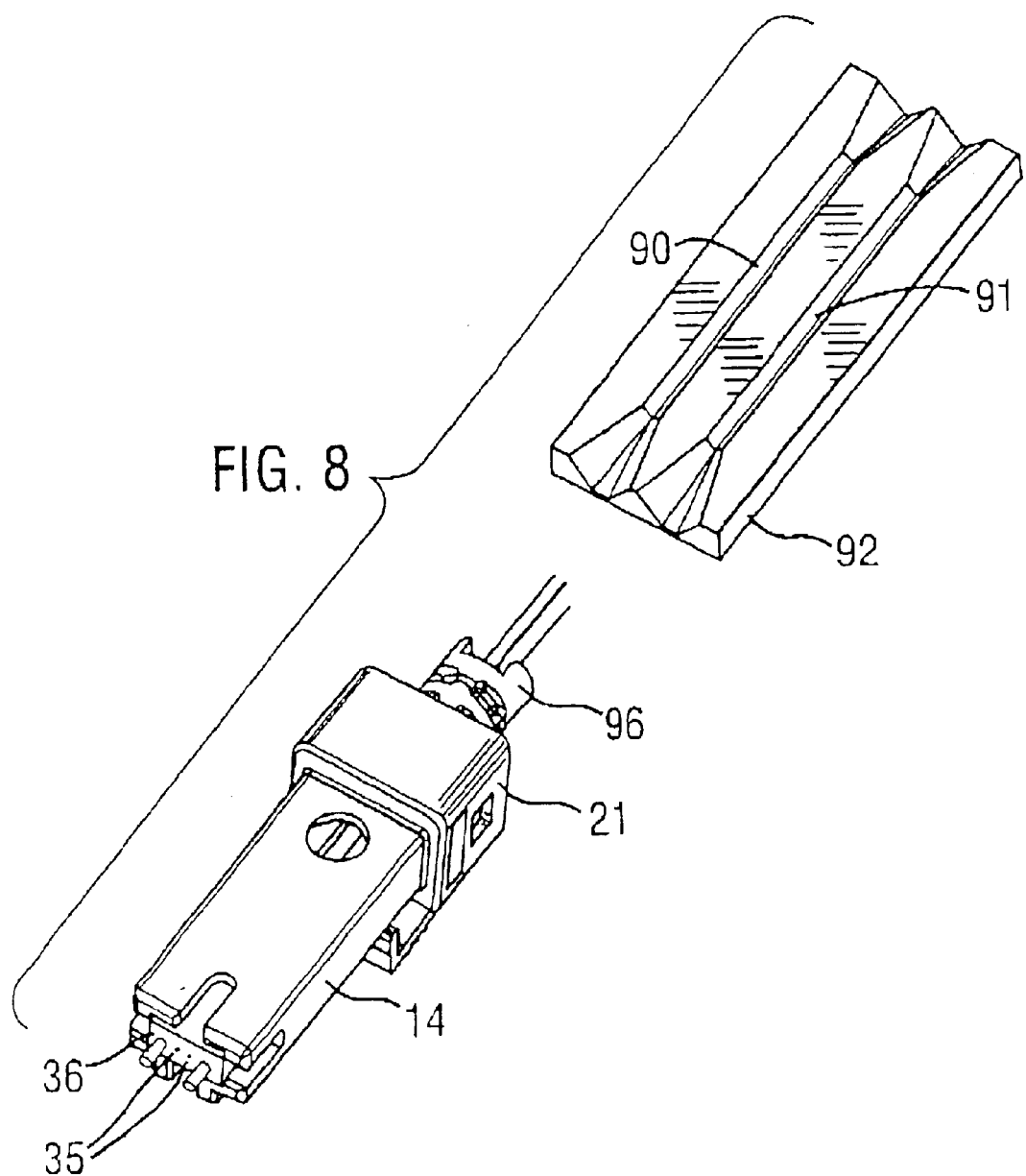
FIG. 8 is a perspective view of the modification according to FIG. 7.
Figure 9:
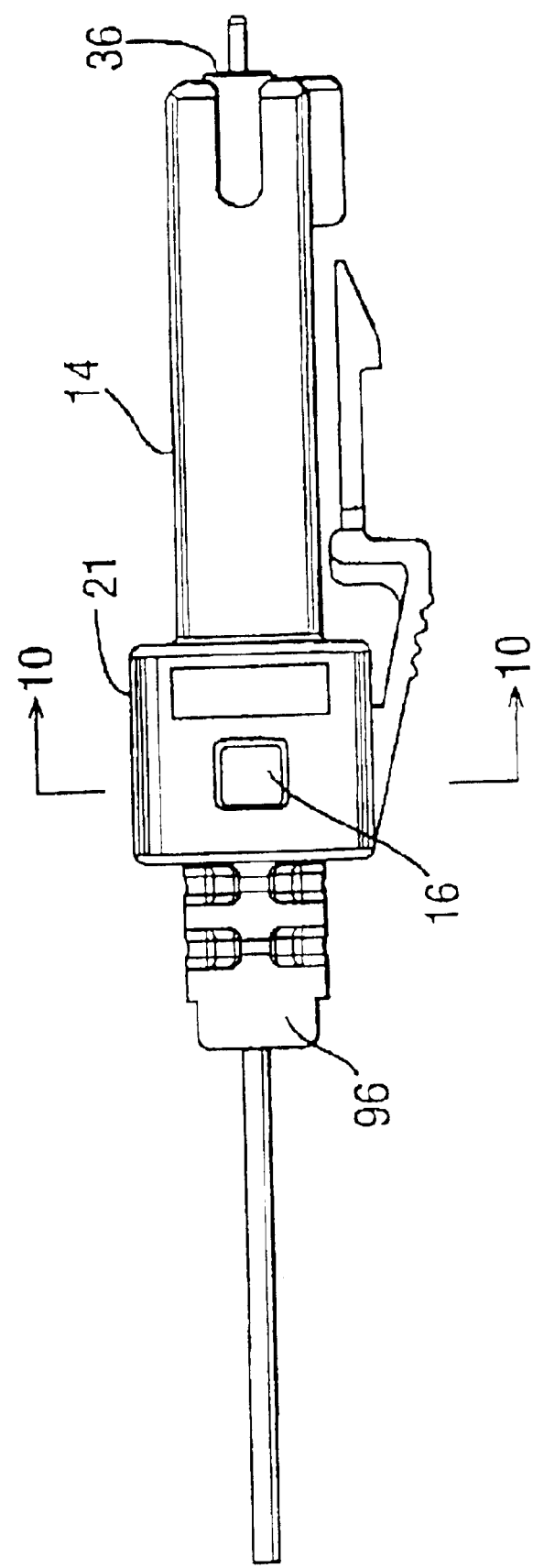
FIG. 9 is a side view of the modification according to FIG. 7.
Figure 10:
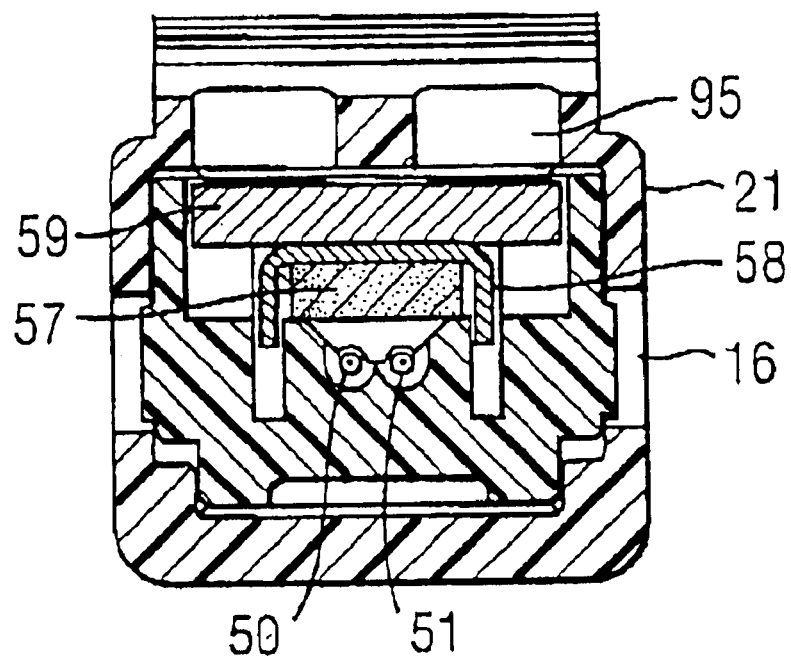
FIG. 10 is a sectional view taken on the line 10—10 of FIG. 9.

The other end of the outer body member 10 has an enlarged portion 21 which is formed integrally with the body portion 14. In the top wall of the enlarged portion 21 are formed two spaced through holes 22. Internally, as shown in FIG. 4, opposite side walls of the body 10 portion 21 have steps shown at 54. The lower wall of the portion 21 has an integrally formed resilient catch element 25 which can be used to secure the plug assembly in another part of an optical fiber connector in a manner which will be apparent to those skilled in the art.

The first member 11 comprises a main body portion 30 of generally rectangular cross-section and an end portion 31 whose dimensions are slightly greater than the body portion 30 so that a step 32 is formed around their junction. The first member 11 has secured therein a pair of optical fiber lengths 35 which at one end are substantially flush with an end face 36 of the first member and at the other end protrude from the end portion 31 as illustrated in FIG. 1. Also the first member 11 has two longitudinally extending bores formed therein, these extending for the full length of the body. The housing part 12 has a first generally channel-shaped section 40 from one end of which projects a pair of spaced pins 41, 42. The channel section 40 defines a compartment 43 which can receive a pair of optical fiber alignment elements in the form of a pair of guide sleeves 44,45 which preferably are optically transparent. Each guide sleeve has a through bore with a diameter corresponding to that of an optical fiber. The ends of each bore are widened to facilitate insertion of an optical fiber. One side wall of the channel-shaped section has an outwardly extending projection 38.

The housing part 12 also includes an end housing part 46 which is formed integrally with the channel-shaped section 40. The end part 46 defines a compartment 47. The lower surface of the compartment 47 defines two side-by-side grooves 48, 49 in which can be located the protective outer sleeves 50, 51 of two optical fibers 52, 53, which are to be terminated. The outer surface of opposite side walls of the end part 46 are stepped at 24. The end wall 55 of the end part 46 has formed therein an aperture 56. The compartment 47 can accommodate above the optical fibers 52, 53 and sleeves 50, 51 a heat responsive adhesive in the form of a glue pellet 57 which is straddled by a thermally conductive saddle 58 on top of which is located an electrical resistor 59 which has conductive pads 60, 61. The saddle may be formed from aluminum or other suitable thermally conductive material.

In order to assemble the plug assembly the pins 41, 42 on the housing part 12 are located within the longitudinally extending bores formed in the first member 11, the housing part 12 is moved towards the first member 11 and the protruding parts of the optical fibers 35 locate into one end of the sleeves 44, 45, which sit within the compartment 43 of the housing part 12.

The assembly of the glue pellet 57, the saddle 58, and the resistor 59 are located in the compartment 47 as shown in FIG. 4 of the drawings. The first member 11 and housing part 12 are moved into the outer body member 10 so that they assume the position shown in FIG. 5 of the drawings. It will be noted that this movement is arrested when the step 32 on the first member 11 comes into contact with the step 20 formed on the interior surface of the outer body member 10. Also at this point the projection 38 on the channel-shaped section 40 locates within the opening 16 to secure the body parts in position. The step 24 on the outer surface of the end part 46 sits on the step 54 on the interior of the body portion 21.

In use the optical fibers to be terminated are fed through the aperture 56 in the end wall 55 into the compartment 47 so that the outer sleeves 50, 51 of the fibers sit within the grooves 48, 49 at the base of that compartment. The optical fibers 52, 53 which protrude from the sleeves 50, 51 are fed into the end of the sleeves 44, 45 until they meet and abut with the optical fiber lengths at a position shown at 65 in FIG. 5.

Optical radiation is then passed through the optical fibers 52, 53 and the junction of the fibers 52, 53 with the optical fiber lengths 35 is detected through the transparent section 19 of the body member 10. If radiation is detectable, this is an indication that the fibers 52, 53 and optical fiber lengths 35 are not aligned and/or abutted correctly. They are then manipulated until the radiation is substantially extinguished indicating correct abutment and/or alignment. At this point an electrical power source is connected to the pads 60, 61 of the resistor by passing electrical conductive terminals of the power source through the apertures 22 formed in the portion 20 of the outer body member 10 so that they contact the pads 60, 61. Electrical current is passed through the resistor 59 which heats up the glue pellet 57 by way of the thermally conducting saddle 58. The power source is in the form of a tool which can be used to apply pressure to the resistor and hence the adhesive in order to cause it to flow around the fibers. The adhesive melts and flows around the optical fibers 52, 53. The thermally conducting saddle has a good thermal conductive bond with the resistor 59. When the current is interrupted the adhesive then resets to secure the fibers 52, 53 in their correct position in alignment and abutment with the optical fiber lengths 35.

It will be appreciated that the above described plug assembly represents a very convenient way of terminating optical fibers in the field since it is relatively simple to use.

The plug assembly as described above is used to terminate a pair of optical fibers. It will be appreciated that the assembly can be used to terminate one or several optical fibers. Also the assembly as described includes a single compartment 47 for receiving the adhesive pellet. It will be appreciated that assemblies can be constructed which have more than one compartment.

Also the assembly as described is used to terminate optical fibers so that they are aligned with optical fiber lengths 35. It will be appreciated that the basic principle of activating a heat responsive adhesive by heating it using an electrically conductive element can be applied generally to many different types of optical fiber splice or connector and not just that described in the above embodiment.

An alternative form of saddle and resistive heating element is shown in FIG. 6 of the drawings. In this arrangement the resistor and saddle are effectively combined into a single element.

The arrangement shown in FIG. 6 comprises a U-shaped member 80 which is formed from ceramic material and which, in use, straddles the glue pellet 57 in much the same way as the saddle 58 of FIG. 1.

A pair of conductive contacts 82, 83 are formed on the upper surface of the U-shaped member 80 and a resistive element 85 extends around the upper surface between the contacts 82, 83.

In use the arrangement operates in a manner similar to that described for FIGS. 1 to 5. Electrically conductive terminals of a power source are passed through the apertures 22 of the portion 21 so that they contact the contacts 82, 83 on the U-shaped member 80. Electrical current from the power source is then passed through the resistive element 85 and the heat generated is conducted through the U-shaped member 80 and melts the glue pellet which then flows around the fibers 52, 53.

In the embodiment described with reference to FIGS. 1 to 5 the alignment means for the fiber lengths 36 and the fibers 52, 53 are sleeves 44, 45.

It will be appreciated that other alignment means can be employed. One example is a V-groove type arrangement which is employed in an alternative embodiment illustrated in FIGS. 7 to 10. The connector shown in these Figures is similar to that of FIGS. 1 to 5, but the alignment is achieved using a pair of V-grooves 90, 91 formed in a component 92. The component 92 is located over the fiber ends to be aligned and abutted which are located on the base of the compartment 43. Each pair of fibers extends along one of the grooves 90, 91 in a manner which will be apparent to those skilled in the art. The component 92 is retained in position in the channel-shaped section 40 by a clip 94.

Other differences with respect to the first embodiment are the location of the aperture 16 and cooperating projection 38, the provision of slots 95 rather than holes 22 for the terminals or electrodes of the power source, and the provision of a cable clamp 96.

Figure 11:
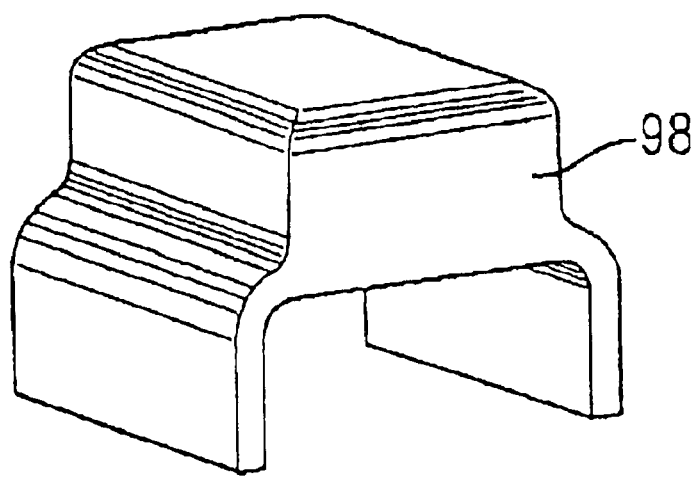
FIG. 11 shows a modified form of saddle.

In the arrangements described above the resistor is accommodated in the compartment 47. It is possible to produce an embodiment in which the resistor is external to the compartment. One example is illustrated in FIG. 11. In this arrangement the saddle is formed with a thicker upper part 98 so that when located in the compartment 47, its upper surface is substantially flush with the upper edges of the walls of the compartment 47. In this example the body part 21 will have a rectangular opening corresponding in shape to the top surface of the saddle, instead of the holes 22.

In use an external resistor, which will be part of the power source, is located in that rectangular opening so that it rests against the upper surface of the saddle. When a current is passed through the resistor the adhesive is heated substantially as described before.

Alternatively the power source can be provided with a coil which can be located against or near the saddle to heat the saddle inductively.

It will be appreciated that the embodiments described are MTRJ type connectors. The basic principle of using a heat responsive adhesive in conjunction with a thermally conductive element such as saddle 58 to can be employed in other types of connector such as SC, LC, ST, LX5, MU, MTP, E200 connectors.

While specific embodiments of the invention have been shown and described in detail to illustrate the application of the principles of the invention, it will be understood that the invention may be embodied otherwise without departing from such principles.

What is claimed is:

1. An optical fiber terminating assembly comprising: a housing which can receive an optical fiber to be terminated so that it is located in alignment with a length of another optical fiber, or an optoelectronic device, the housing including a compartment through which the optical fiber to be terminated can extend; a heat responsive adhesive element; and a thermally conductive element, said compartment for receiving said heat responsive adhesive element and said thermally conductive element, said thermally conductive element being coupleable to a source of energy so that heat in the thermally conductive element causes the adhesive to melt and flow around the optical fiber to secure it in position.

2. The assembly according to claim 1, wherein said compartment accommodates said heat responsive adhesive, said thermally conductive element, and an electrically conductive element, said electrically conductive element being mounted such that when an electrical current is passed through the electrically conductive element the heat in the thermally conductive element melts the adhesive.

3. The assembly according to claim 1, wherein said compartment accommodates said heat responsive adhesive and said thermally conductive element, said compartment having access for a heat source to be coupled with the thermally conductive element.

4. The assembly according to claim 2, wherein said electrically conductive element is a resistor.

5. The assembly according to claim 1, wherein the thermally conductive element is a metallic element.

6. The assembly according to claim 1, wherein said thermally conductive element is a saddle which straddles the adhesive element.

7. The assembly according to claim 1, wherein the thermally conductive element is a ceramic saddle provided with resistive portions to which an electrical current can be applied.

8. The assembly according to claim 1, wherein the housing is formed to terminate more than one optical fiber.

9. The assembly according to claim 1, wherein the optical fiber includes a sleeve, said compartment is configured to receive a portion of the sleeve, so that the heat in said thermally conductive element causes the adhesive to melt and flow around the sleeve to secure it in position.

10. The assembly according to claim 9, wherein said compartment includes at least one groove configured to receive the portion of the sleeve of the optical fiber.

11. An optical fiber terminating assembly comprising an outer body member, a first member locatable within said body member, said first member carrying a length of optical fiber which protrudes therefrom, a housing locatable in alignment with the first member, an optical fiber alignment means for receiving the end of the length of optical fiber which protrudes from the first member, said housing having an access opening for receiving an optical fiber to be terminated so that said fiber can be located in the alignment means so as to be aligned and abutted with the optical fiber length, said housing including a compartment through which the optical fiber to be terminated extends, said compartment being designed to receive a heat responsive adhesive element and a thermally conductive element, which can be coupled to a source of energy so that heat in the thermally conductive element causes the adhesive to melt and flow around the optical fiber to secure it in position.

12. The assembly according to claim 11, wherein said compartment accommodates said heat responsive adhesive, said thermally conductive element, and an electrically conductive element, said electrically conductive element being mounted such that when an electrical current is passed through the electrically conductive element the heat in the thermally conductive element melts the adhesive.

13. The assembly according to claim 11, wherein said compartment accommodates said heat responsive adhesive and said thermally conductive element, said compartment having access for a heat source to be coupled with the thermally conductive element.

14. The assembly according to claim 12, wherein said electrically conductive element is a resistor.

15. The assembly according to claim 12, wherein the thermally conductive element is a metallic element.

16. The assembly according to claim 11, wherein said thermally conductive element is a saddle which straddles the adhesive element.

17. The assembly according to claim 11, wherein the thermally conductive element is a ceramic saddle provided with resistive portions to which an electrical current can be applied.

18. The assembly according to claim 11, wherein the outer body member includes one or more openings located to allow either connection of an electrical power source to said electrically conductive element, or the application of an external energy source.

19. The assembly according to claim 11, wherein the housing is formed to terminate more than one optical fiber.

20. A method of terminating an optical fiber or fibers using an assembly with a housing which can receive the optical fiber to be terminated in alignment with a length of another optical fiber, or an optoelectronic device, the housing including a compartment through which the optical fiber to be terminated can extend, a heat responsive adhesive element and a thermally conductive element, the method comprising:

positioning an end of the optical fiber to be terminated in the housing so it is in alignment with the length of the other optical fiber, or optoelectronic device;

heating said thermally conductive element such that the adhesive assumes the state in which it can flow around the optical fiber to be terminated and secured in position in alignment with the optical fiber length, wherein the compartment accommodates the heat responsive adhesive element and the thermally conductive element.

21. The method according to claim 20, including sensing alignment of the optical fiber to be terminated with the optical fiber length by passing radiation along the fibers and observing the level of radiation detectable at the junction of the optical fiber and the optical fiber length.

22. The method according to claim 20, further comprising positioning a portion of a sleeve of the optical fiber in the compartment so that the step of heating causes the adhesive to flow around the sleeve to secure it in position.

23. The method according to claim 22, wherein the compartment includes at least one groove configured to receive the portion of the sleeve of the optical fiber.

\* \* \* \* \*